United States Patent

Tew, Jr.

[15] 3,689,884

[45] Sept. 5, 1972

[54] DIGITAL CORRELATOR FOR CALCULATING FIGURE OF MERIT OF COMMUNICATION TRANSMISSION SYSTEM

[72] Inventor: Walter Hosey Tew, Jr., Deland, Fla.

[73] Assignee: General Electric Company,

[22] Filed: Dec. 31, 1970

[21] Appl. No.: 103,033

[52] U.S. Cl. ..............................340/146.1 E, 325/41

[51] Int. Cl. ............................................G08c 25/00

[58] Field of Search.......340/146.1, 146.1 E; 325/41, 325/42

[56] References Cited

UNITED STATES PATENTS

| | | | |
|---|---|---|---|
| 3,274,379 | 9/1966 | Hinrichs | 340/146.1 E |
| 3,315,228 | 4/1967 | Futerfas et al. | 340/146.1 E |
| 3,496,536 | 2/1970 | Wheeler et al. | 340/146.1 E |
| 3,562,710 | 2/1971 | Halleck | 340/146.1 E |
| 3,596,245 | 7/1971 | Finnie et al. | 340/146.1 E |

*Primary Examiner*—Charles E. Atkinson
*Attorney*—Raymond H. Quist, Allen E. Amgott, Henry W. Kaufmann, Frank L. Neuhauser, Oscar B. Waddell and Joseph B. Forman

[57] ABSTRACT

A circuit for providing a measure of the fidelity of a communication transmission (figure of merit) by determining the correlation between a transmitted sequence of digital numbers with the same numbers locally generated. The number of correlated digital numbers is counted (hits) which occur during a transmission of a total number of digital numbers (hits plus misses). The number of hits in binary form is converted to the number of hits minus misses by shifting the digit in the most significant bit position to that of the least significant bit. This binary number is a close approximation of the figure of merit (disregarding the decimal point).

2 Claims, 1 Drawing Figure

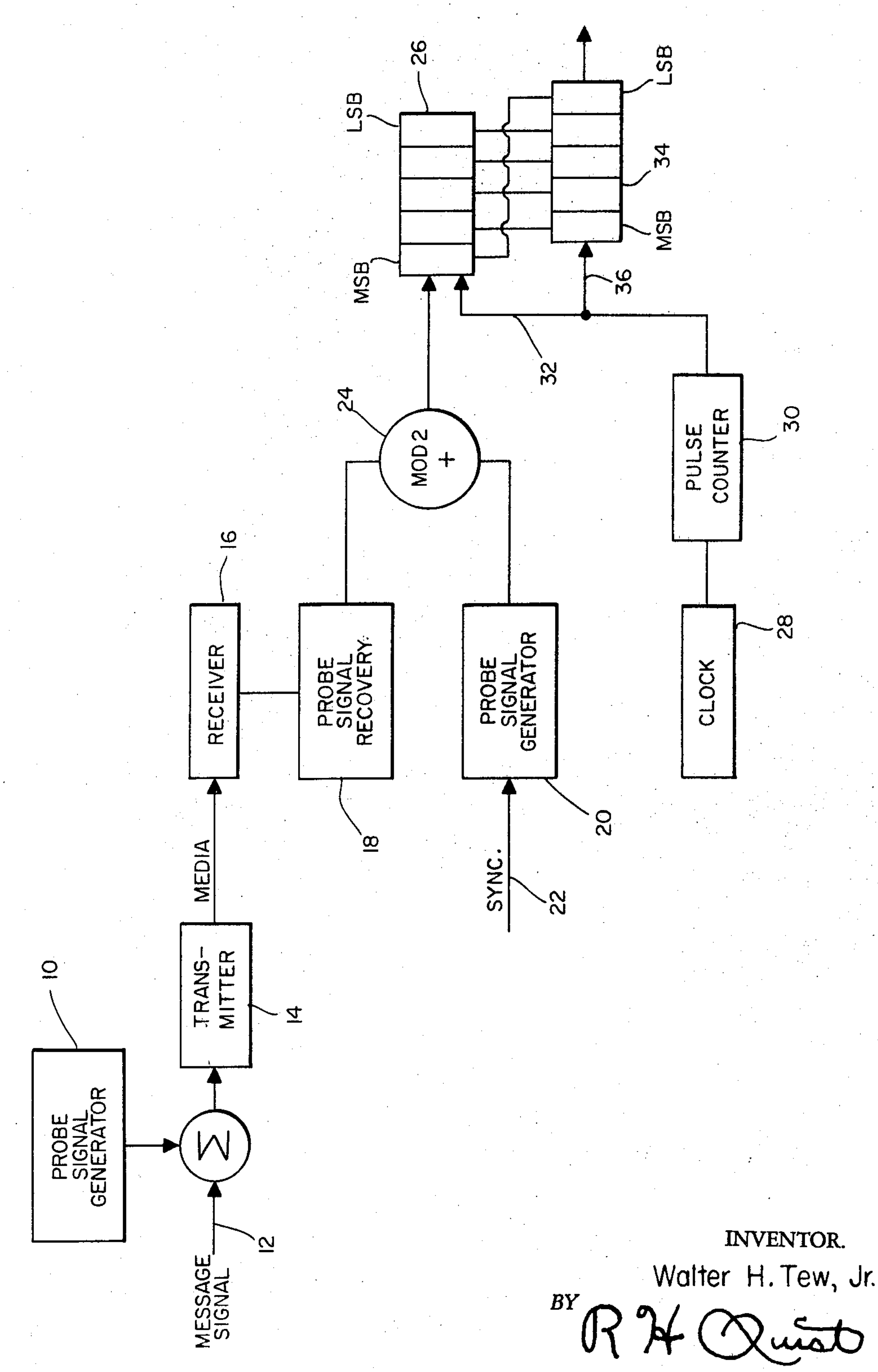
INVENTOR.
Walter H. Tew, Jr.
BY R H Quist
ATTORNEY.

DIGITAL CORRELATOR FOR CALCULATING FIGURE OF MERIT OF COMMUNICATION TRANSMISSION SYSTEM

BACKGROUND OF THE INVENTION

This invention relates generally to a system for measuring the deviation of a communication transmission system from that of an ideal system, and more particularly to a digital correlator.

A measure of the fidelity with which a transmission system conducts a signal is used not only in comparing one system with another, but also as a means for improving the fidelity through compensation techniques. One measuring approach involves adding to the signal to be transmitted a probe signal in the form of a series of pulses at two voltage levels. These pulses will be considered binary "1"s and "0"s. When a "1" is transmitted and received, or a "0" is transmitted and received it is counted as a "hit" (*H*). When a "" is transmitted and a "0" received, or vice versa, it is counted as a "miss" (*M*). A figure of merit (*F.M.*) for the transmission system is computed by:

$$F.M. = H - M/H + M$$

A previously devised method for obtaining the figure of merit involved using a first counter for recording hits, a second counter for recording misses, a subtractor for determining $H - M$, a third counter recording clock pulses (equivalent to $H + M$), and a divisor circuit.

SUMMARY OF THE INVENTION

In a preferred form of the invention, a probe signal constituting a predetermined sequence of "1"s and "0"s is added to a conventional message and sent through a communication transmission system. At the receiver, the probe signal is recovered and compared with the same sequence of "1"s and "0"s locally generated. A counter records the number of times the two digital numbers are the same (hits) for a fixed number of digits. The fixed number of digits is one less than a power of two. The number of hits in the counter is shifted to a register, with the most significant bit in the counter becoming the least significant bit in the register. This number is a close approximation of the figure of merit.

BRIEF DESCRIPTION OF THE DRAWING

The drawing is a schematic circuit diagram of an embodiment of the invention.

DESCRIPTION OF THE PREFERRED EMBODIMENT

Referring to the FIGURE, probe signal generator 10 produces a predetermined signal of digital form which can be considered a sequence of "1"s and "0"s. This probe signal is added to a normal message signal 12, (for example by using an analog summing amplifier), and transmitted by transmitter 14. The signal is carried by one of the usual media to receiver 16 where probe signal recovery unit 18 extracts the probe signal. At this point, of course, noise and distortion have degraded the original probe signal. Probe signal generator 20 produces the same sequence of "1"s and "0"s as probe signal generator 10. Synchronization signal 22 is utilized to assure that the sequence of "1"s and "0"s from both probe signal recovery unit 18 and probe signal generator 20 are in synchronism. Both signals are applied to modulo 2 adder 24 which will produce a "hit" signal each time both signals have a "1" or both a "0." In accordance with the invention, these hits are counted in 5 bit counter 26.

Clock 28 produces pulses at the rate of the probe signals which are counted in 5 bit pulse counter 30 which is designed to produce an output signal after 31 pulses. In general, for an N-stage counter, the output signal is produced at the $2^N$—1 pulse. At this time, clock pulses equivalent to hits plus misses have been counted.

The output signal from pulse counter 30 is applied to binary counter 26 as a clear pulse 32 and to register 34 as a parallel transfer command causing the count contained in counter 26 (the number of hits) to be shifted to register 34 in the following manner. The most significant bit in counter 26 becomes the least significant bit in register 34, and all other bits in counter 26 are moved to a position in register 34 one place to the left of the corresponding position in counter 26. As will be demonstrated, the resulting binary count in register 34 is a close approximation to the figure of merit which is desired to be obtained and register 34 can be considered a figure of merit register.

As an example of the mathematics being implemented, if:

| | |
|---|---|
| Hits + Misses | = 31 |
| and Hits | = 27 |
| Misses = 4 | |
| ∴ Hits − Misses | = 23. |

But the hit count of 27 in binary form is 11011, and when the most significant bit is shifted to become the least significant bit the result is 10111 or 23, the number of hits minus misses.

If the denominator in the figure of merit equation had been an even power of 2, the division could have been performed by shifting the decimal point N places to the left in the binary number. In this case the denominator is $2^N$—1 rather than $2^N$. The error E, introduced by dividing by $2^N$ becomes small as N increases. It can be shown as:

$$\% E = \frac{2^N - (2^N - 1)}{2^N} \times 100$$

$$= \frac{2^N - 2^N + 1}{2^N} \times 100$$

$$\% E = \frac{1}{2^N} \times 100$$

or if N = 8, less than 1 percent.

Thus by employing counters and registers sufficiently large, the error can be reduced to any desired degree. Since the logic is performing simple adding and shifting, the technique of this invention is a rapid one, as well as one which can be implemented with readily available circuit elements.

While a particular embodiment of a digital correlator in accordance with the invention has been illustrated and described, it is obvious that changes and modifications can be made without departing from the spirit of the invention and the scope of the appended claims.

I claim:

1. In a communication transmission system having a transmitter, an intervening media, and a receiver, a digital correlator for producing a figure of merit comprising:

a first probe signal generator producing a sequence of binary digits;

means for applying said sequence of binary digits to said transmitter;

probe signal recovery means connected to said receiver for extracting said sequence of digits;

a second probe signal generator producing a sequence of binary digits identical to those produced by said first probe signal generator and in synchronism with those extracted from said receiver;

means for comparing the extracted sequence and the sequence produced by said second probe signal generator and producing an output signal for each hit;

a binary counter connected to receive said hit output signals and incremented by one for each output signal and adapted to transfer its contents upon receiving a clear signal;

a figure of merit register connected to receive upon a clear signal, in a parallel transfer mode, the contents of said binary counter except that the most significant bit of said binary counter contents becomes the least significant bit of the figure of merit register;

clock means producing pulses at the rate of the probe signal; and an N-stage binary counter connected to receive the pulses produced by said clock means, incremented at the rate of the probe signal and delivering a clear signal at the $2^N-1$ count to said binary counter and said figure of merit register.

2. A communication system in accordance with claim 1 wherein:

said means for comparing the extracted sequence and the sequence produced by said second probe signal generator is a modulo 2 adder connected to receive the outputs of the probe signal recovery means and the second probe signal generator.

* * * * *